(12) United States Patent
Macher et al.

(10) Patent No.: US 6,378,948 B1
(45) Date of Patent: Apr. 30, 2002

(54) SUPPORTING PART FOR A SEAT

(75) Inventors: David Macher, Votisberg; Heinz Zorn, Eggersdorf, both of (AT)

(73) Assignee: Magna Reflex Holding GmbH, Assamstadt (DE)

(*) Notice: Subject to any disclaimer, the term of this patent is extended or adjusted under 35 U.S.C. 154(b) by 0 days.

(21) Appl. No.: 09/445,629

(22) PCT Filed: Jun. 23, 1998

(86) PCT No.: PCT/DE98/01781

§ 371 Date: Mar. 27, 2000

§ 102(e) Date: Mar. 27, 2000

(87) PCT Pub. No.: WO98/58572

PCT Pub. Date: Dec. 30, 1998

(30) Foreign Application Priority Data

Jun. 23, 1997 (AT) ..................................... GM 384/97 U

(51) Int. Cl.⁷ ................................................. A47C 7/02
(52) U.S. Cl. .................. 297/452.28; 5/421; 297/180.12
(58) Field of Search ....................... 297/452.28, 180.11, 297/180.12, 180.13, 452.26, 452.27, 180.1; 5/421, 653, 654

(56) References Cited

U.S. PATENT DOCUMENTS

| | | | | |
|---|---|---|---|---|
| 2,712,592 A | * | 7/1955 | Goldstein et al. ... | 297/180.12 X |
| 3,136,577 A | * | 6/1964 | Richard ............. | 297/180.12 X |
| 3,924,284 A | * | 12/1975 | Nelson ............... | 5/421 X |
| 4,378,396 A | * | 3/1983 | Urai et al. ........... | 297/219.1 X |
| 4,591,693 A | * | 5/1986 | Pike .................. | 5/421 X |
| 4,695,091 A | * | 9/1987 | Altmann et al. ....... | 297/180.12 |
| 4,869,550 A | * | 9/1989 | Lorenzen et al. ...... | 297/180.12 |
| 5,329,096 A | * | 7/1994 | Suematsu ............. | 5/421 X |
| 5,516,189 A | * | 5/1996 | Ligeras ............... | 297/180.11 |
| 5,934,748 A | * | 8/1999 | Faust et al. ......... | 297/180.13 X |

FOREIGN PATENT DOCUMENTS

| | | | | |
|---|---|---|---|---|
| EP | 0 143 742 | | 10/1984 | ........... B60N/1/00 |
| EP | 0 405 481 A1 | | 6/1990 | ........... A47C/31/12 |
| WO | WO 96/28056 | * | 9/1996 | |

OTHER PUBLICATIONS

International Search Report of PCT Application WO 98/5872.

* cited by examiner

Primary Examiner—Peter M. Cuomo
Assistant Examiner—Stephen Vu
(74) Attorney, Agent, or Firm—Clark Hill PLC

(57) ABSTRACT

A supporting part for a seat has at least one plastic layer made of a material composed of thermally reversibly deformable material. The plastic layer can be shaped from a first shape into any predeterminable second shape at a shaping temperature higher than its temperature of use and can be fixed in this reversible shape at a temperature range lower than the shaping temperature. This layer can also be returned to its first shape by reheating it up to the shaping temperature. Another layer arranged as a heating layer is provided to apply a thermal treatment to the intermediate layer made of a material that can also o be reversibly deformable.

13 Claims, 2 Drawing Sheets

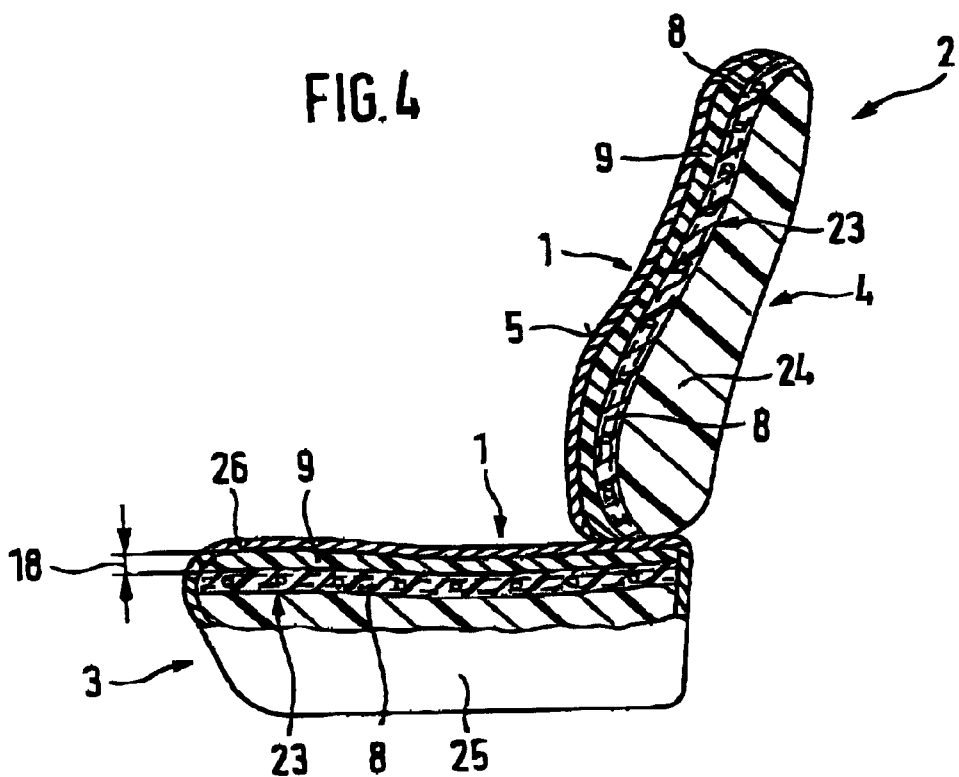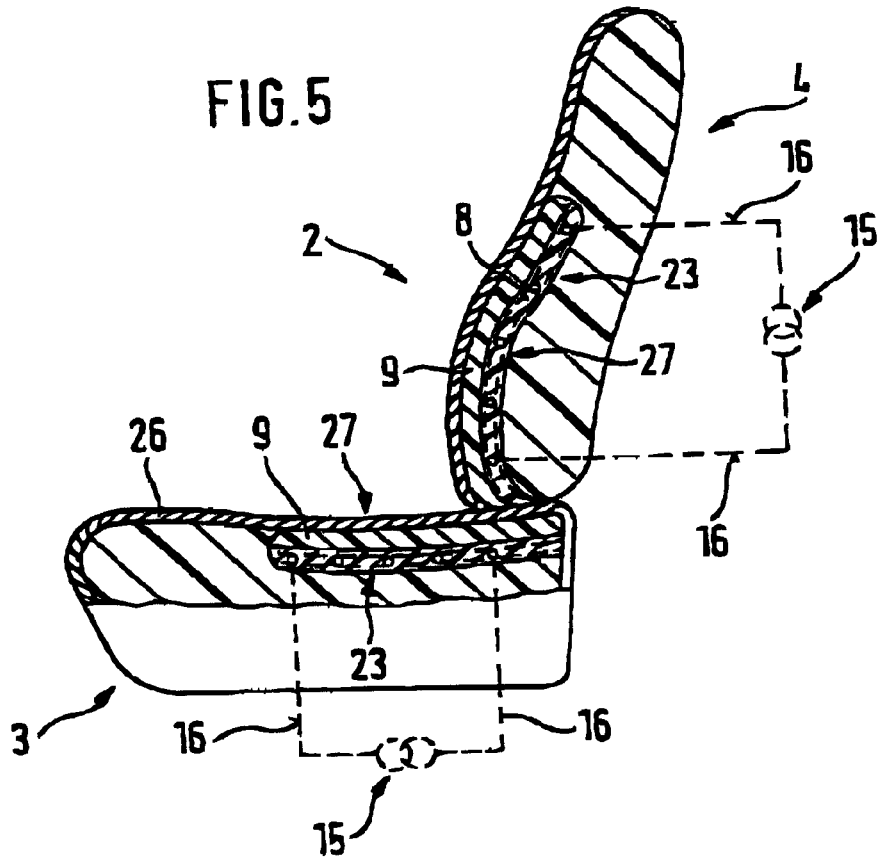

SUPPORTING PART FOR A SEAT

BACKGROUND OF THE INVENTION

1. Field of the Invention

The present invention relates to a supporting part to rest upon a seat. More particularly, the invention relates to a seat having a supporting part being formed as an insert part.

2. Description of the Related Art

Seats with pads made of cellular materials are widely employed for private use as well as in the modern construction of vehicles. Above all, they are employed for upholstered furniture, but also for rail vehicles and road vehicles as well as in airplanes. Such seats are well known from DE 85 06 816 U, WO 87/06894 A1 and EP 0 190 064 A1 documents. With those seats being designed in such a manner, it is disadvantageous that they do not have any possibility for adapting to a particular user. Furthermore, in the above mentioned documents seats are described which comprise a multilayer structure and by this means mastering various requirements, including for example fire resisting layers, with the seats, cannot be adapted to the interest of a single user.

SUMMARY OF THE INVENTION

The invention is based on the object to provide a supporting part and seat respectively, which can be adapted to an outer spatial form and body form of a user, respectively.

The greatest advantage is that one layer of the supporting part is composed of a multiple thermally reversible layer of cellular materials adapting to a pressed spatial shape after heating to a forming temperature and maintaining the shape thereof after a cooling process. Another advantage originates in that the layer after heating thereof resets into its original spatial shape and a new forming operation can be performed.

With this advantageous formation, an optimal support of the user's body upon a seat is enabled, wherein avoiding of pains due to longer sitting, for example in a motor car, and reduction of bad posture can be obtained.

Another advantage is that the multiple thermally reversible layer of the supporting part and the insert part, respectively, are deposited upon a heating layer enabling the heating layer to be heated to the forming temperature. This heating layer is fed by means of a motor power, which for example can include a standard vehicle battery.

Furthermore, it is advantageous to regulate the temperature of the heating layer by means of a control device, whereby operation below the forming temperature of a thermally reversibly deformable layer is permitted, such that the supporting and insert parts, respectively, can be used as a common seat heating installation.

By placing into a seat, one or more supporting parts and supporting parts, particular user's requirements can be carried out. These supporting parts thus can also be formed as insert parts, whereby these will be disposed to certain problem zones of the user's body, and pain-relieving effects can thus be obtained above all with bad posture. This can also be enabled by heating of the insert parts in the area of painful limbs of the user, such that a seat with heating installation being adapted to the contour of the user can be provided.

Other advantageous improvements are described within the claims and can be taken from the detailed description of the figures.

BRIEF DESCRIPTION OF THE DRAWINGS

The invention is explained below in greater detail according to the embodiments shown in the drawings, in which

FIG. 4 is a partly sectioned side view of a seat, in particular a vehicle seat, in which the supporting part according to the invention is integrated as shown in FIG. 1 through 3; and FIG. 5 is another embodiment of the supporting part as shown in FIG. 4, being partly sectioned.

DETAILED DESCRIPTION OF THE PREFERRED EMBODIMENT

Figure 1:
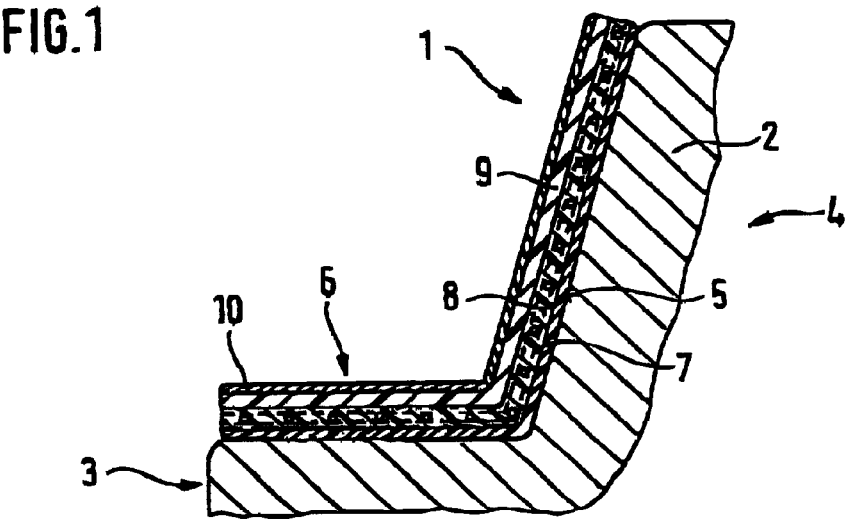
FIG. 1 is a side sectional view of the supporting part according to the invention in a position, in which it is placed upon a seat.
Figure 2:
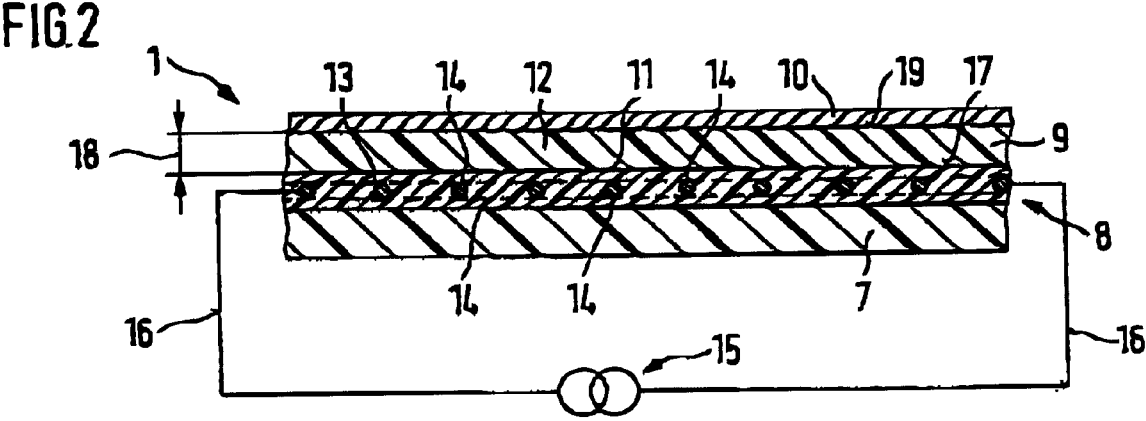
FIG. 2 is a side sectional view of the layer structure of the supporting part according to invention in a large scaled illustration.
Figure 3:
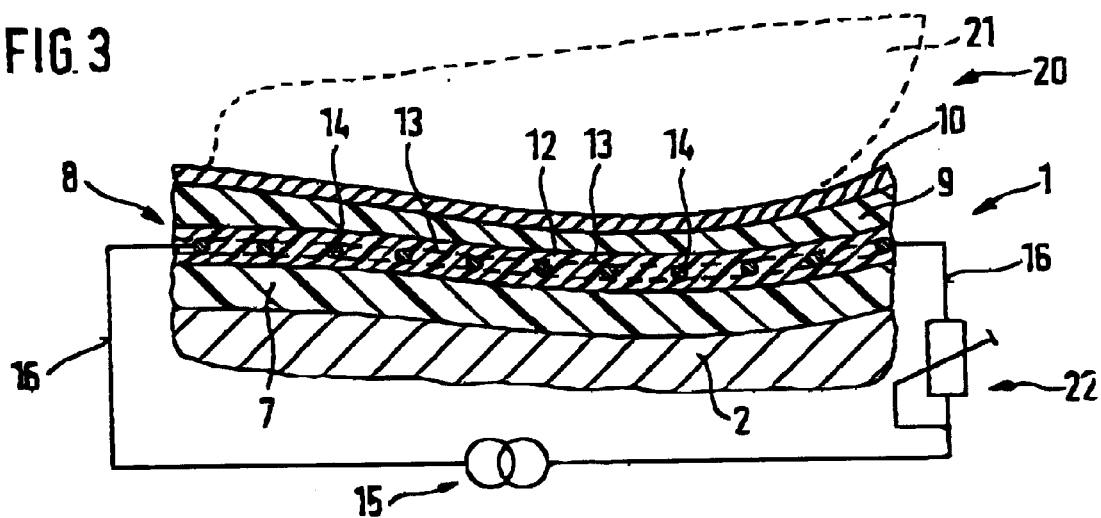
FIG. 3 is a partly sectioned side view of the supporting part according to the invention as shown in FIG. 2 in greatly simplified illustration, with the supporting part in a configuration being deformed upon load.

In FIGS. 1 through 3 the multiple layer structure of a supporting part is shown, wherein the shape thereof can be adapted to the user's shape. Additionally, a plastic layer is provided as an intermediate layer 9 made of thermally reversible, deformable material and a heating means heating the material. The material is plastic or cellular materials having closed pores, into which gas such as air is contained. With heating of the plastic above a forming temperature or deforming temperature and with applying a force, the pores deform depending on a force vector, that means, the gas therein is compressed, and after cooling below the forming temperature and removing the force, the form of pores is maintained by the plastified plastic material.

When the plastic material is reheated to appropriate temperatures and no force is applied, the pores take on its original shape by virtue of the gas pressure. With corresponding life of the material the forming operation can often be repeated.

The heating means is formed as resistance heating installation which includes electric conductors as heating members and a power supply. In the illustrated embodiment the electric conductors are embedded into a separate heating layer 8, but can also be provided as a composite with the thermally reversibly deformable material. For example, electric conductors carbon fibers are suitable, which are composed of a plurality of filaments being formed into a rope and worked into the heating layer 8 or plastic layer of the deformable material in a crossbarred, arcuated, meandering shaped or in other manner. For electric conductors other materials such as copper or other electrically conducting materials are also usable.

The supporting part 1 shown in FIG. 1 is suitable for rest upon all possible seats 2 such as vehicle seats, upholstered seats etc., which comprise a seat part 3 and back rest part 4, respectively. Herein, the supporting part 1 is put upon a surface 5 of seat 2 facing to the user and is connected therewith, respectively. This connection can be performed by means of all possible or well known connecting devices, which in this case can be applied, such as velcro or something similar. The advantage of such a connecting device is that, if required for cleaning, it can be released and reestablished afterwards without great expense.

In this embodiment supporting part 1 is formed by a sandwiched or multilayer member 6 and comprises a supporting layer 7 facing to a surface 5 of seat 2. On one side of the supporting layer 7 being opposite to the seat 2 is situated a heating layer 8 followed by an intermediate layer 9 made of thermally reversibly deformable material and a covering layer 10 limiting the intermediate layer 9 in opposite direction toward a seat 2.

In FIG. 2 the sandwiched structure is shown on the basis of a section of the supporting part 1 according to the invention On one side of the supporting part 1 facing to the seat 2 a supporting layer 7 is disposed, which is preferably composed of a resilient or foamed plastic. With this material choice of the supporting layer 7, an adaption of the entire supporting part 1 to the spatial shape of seat 2 is guaranteed.

In principle, single layers will be connected with each other by means of glueing, wherein all other connecting methods, which can be used for the supporting part, however, such as thermal covering or something similar are usable.

Upon surface 11 of the supporting layer 7 facing to a covering layer 10, heating layer 8 is disposed, which serves for heating an intermediate layer 9. With this heating layer 8, for example, an epoxy resin layer 12, into which a grid of strip conductors 13, for example made of carbon fibers 14, is embedded. The strip conductors 13 can also be disposed between two insulating films forming as a whole the heating layer 8. With this formation of heating layer 8 or epoxy resin layer 12 comprising embedded carbon fibers 14, heating thereof or of surrounding layers is enabled by applying current via lines 16 from a power supply 15, as diagrammatically indicated herein. This power supply can be performed by means of an electric power supply as well as accumulators. The current from the power supply 15 is controllable, such that a different temperature rise of the heating layer 8 or the surrounding layers is permitted. In this case, for the supporting layer 7, a material compound consisting of polyvinyl chloride for the most part and polyurethane proportionally is of advantage, since this material has a low coefficient of thermal conduction. With this choice of material an undesired heat transmission from heating layer 8 is prevented, with heat transmission possibly having a negative influence on the seat 2.

Intermediate layer 9 is disposed on the surface 17 of heating layer 8 being opposite to the surface 11 of supporting layer 7. This intermediate layer 9 is composed of ethylene vinyl foam or polyethylene foam free from fluorocarbon with closed air voids, for example, which is thermally, reversibly, deformable formed, wherein each further plastic obtaining the same requirements can be used. By means of the material of the intermediate layer 9, as mentioned above, the intermediate layer 9 is allowed to be deformed at a forming temperature exceeding the temperature of application from an initial spatial shape into a second spatial shape being adapted to a user. After remaining the forming temperature this second spatial shape is retained thus maintaining its shape specifically adapted to a user within a range of the temperature of application, which is within the range of body temperature when used. The material of the intermediate layer 9 includes characteristics being similar to a memory foam, that means, it is highly compressible with force and resets into its original spatial shape after load operation is ended.

Adapting the spatial shape of an intermediate layer 9 to another or a new user is allowed in that the intermediate layer 9 takes up its initial spatial shape with recent heating to the forming temperature thus a re-adapting to another spatial shape is allowed, wherein this described process can be repeated as well.

Density or specific gravity of the intermediate layer 9 can equal from 30 kg/m$^3$ to 280 kgm$^3$, whereby adapting to various loads can be performed or various weights of the user can be taken into consideration. For this reason, inside the portion of the seat part 3 the intermediate layer 9 can comprise a density being higher than the intermediate layer 9 inside the portion of back rest part 4, since higher loads are created with user's body weight inside the portion of seat part 3.

The forming temperature the intermediate layer 9 is at 50° C. to 90° C., preferably at 70° C. to 80° C., however. This temperature range proves to be particularly preferred since a formation of intermediate layer 9 is enabled herein, but the deformation and destruction, respectively, of adjacent layers is avoided. Of course a thickness 18 of the intermediate layer 9 can be varied by using different spatial weights, i.e. the intermediate layer 9 has a lower thickness 18 with a higher spatial weight of material.

On the upper side 19 of intermediate layer 9 opposite to the heating layer 8 a covering layer 10 is further applied. This covering layer 10 formed for example by a textile ply such as a woven cloth, knit fabrics or braid, can be deposited upon the intermediate layer 9 by glueing and also by thermal covering. Manufacturing of supporting part 1 preferably takes place in large surface webs and reels respectively, wherein the covering layer 10 has to be deposited upon the intermediate layer 9. In this case, connection of the covering layer 10 with the intermediate layer 9 by thermal covering is of advantage, since large surface applying of an adhesive layer upon the intermediate layer 9 is very lavish and can also affect the advantageous characteristics of the intermediate layer 9 by it rigidity.

In FIG. 3 a forming operation of the supporting part 1 being put upon a seat 2 is shown, wherein the forming operation is caused by a human body 20, in particular by a backside 21 indicated with short dashed lines.

In order to enable adapting the supporting part 1 and the intermediate layer 9, respectively, to the spatial shape of a human body 20, the intermediate layer 9 is heated by means of the heating layer 8 up to a temperature of about 80° C. as follow. By means of lines 16 being connected to a power supply 15, electric energy is applied to the strip conductors 13 preferably composed of carbon fibers 14, which are embedded into an epoxy layer 12. These strip conductors 13 or carbon fibers 14 have a high electric resistance, wherein temperature rise thereof occurs by applying electric energy as generally known. Some advantages result from the adjustable applying of electric energy to the heating layer or to carbon fibers 14, whereby the final temperature rise of the heating layer 8 can be regulated and controlled, respectively.

When the intermediate layer 9 was heated to its forming temperature, thus the human body 20 or backside 21 in this case is placed upon the supporting part 1 being put on the seat 1, and by virtue of thermally deformable characteristics of the intermediate layer 9, its spatial shape is adapted into the spatial shape of the backside 21. After placing the backside 21 upon the supporting part 1, the feeding of heating layer 8 with electric energy is interrupted, whereby a self temperature lowering of the intermediate layer 9 below the forming temperature is enabled.

Since naturally all the other mounted layers of the seat 2 are also deformed by placing the human body 20 and backside 21, respectively, upon the supporting body 1, it is of particular advantage to embed the strip conductors 13 being composed of carbon fibers 14 into the heating layer 8 in a grid or net shaped manner, since this heating layer 8 also adapts resiliently to deformations, thus damaging or destroying of the carbon fibre grid and carbon fiber net, respectively, can be avoided.

These materials of the single layers of the supporting part 1 advantageously comprise flexible reset characteristics, whereby resetting into an original position is ensured with deformation caused by sitting down of the user upon the seat 2 or by raising of the user from the seat 2.

A particular advantage results from the arrangement of an electric control means 22 in the lines 16, since thereby controlling of electric energy supply to the heating layer 8 is enabled. By means of this formation, the supporting part 1 or heating layer 8 can be used as a set heating installation, when heated below the forming temperature of the intermediate layer 9, since affecting the intermediate layer 9 or other layers does not occur with this heating below the forming temperature of the intermediate layer 9.

By means of the multiple thermally reversible configuration of the intermediate layer 9 it is possible to adapt the one and same supporting part 1 to another user. In this case, intermediate layer 9 above heating layer 8 is recently heated to the forming temperature of approximately 80° C., whereby resetting thereof into its original spatial shape and recently applying a particular spatial shape is enabled.

In order to ensure faster or secured fill surface temperature rise of the intermediate layer 9, it is also possible to provide a heating layer 8 at both sides of the intermediate layer 9. These heating layers 8 can be supplied together with electric energy via control means 22, whereby continuous heating of the intermediate layer 9 is ensured.

In FIG. 4 a seat 2 with each a seat part 3 and a back rest part 4, which are independent from each other, is shown. In this embodiment the supporting part 1 is integrated into the layer structure of the seat part 3 or back rest part 4, wherein the single supporting parts 1 are formed as insert parts 23.

In this case, the single insert parts 23 can be composed of the heating layer 8 and the thermally reversibly deformable intermediate layer 9 only, since the heating layer 8 can be deposited upon a supporting body 24 of the back rest part 4 or supporting part 25 of the seat part 3 as being present with the common seats 2. Experience shows that the load of human body 20 or the deformation with the seat part 3 of seat 2 is stronger than inside the back rest part 4. By virtue of this fact and separate formation of the insert parts 23 it is possible to coordinate the single insert parts 23 with respect to its thickness or condition of the single layers with the loads which effect upon the back rest part 4 or seat part 3 of the seat 2.

For the seat part 3 of seat 2, an intermediate layer 9 of the respective insert part 23 is thus recommended to have a relatively high density, in order to lower maintaining thickness 18 of the thermally reversibly deformably formed intermediate layer 9, whereby the space requirement of an insert part 23 inside seat part 3 becomes less. In order to maintain under load in the back rest part 4 of seat 2 the same total extension of insert part 23 as in the seat part 3, it is possible to form this intermediate layer 9 having less density in material to obtain the same thickness 18 of the intermediate layer 9 in the seat part 3.

In this embodiment, the layer structure of insert parts 23, can also be done without covering layer 10, since this is substituted by cover material 26 encompassing the seat part 3 and back rest part 4 of seat 2.

As shown better in FIG. 5, it is also possible for the insert parts 23 for seats 2 to be disposed as only areas in the seat part 3 and back rest part 4. In this embodiment the insert parts 23 are formed as portions 27, which are specifically mounted on problem zones of the human body, or where such problem zones contact the seat 2. This configuration of portions 27 is particularly advantageous for placing in the area of backside 21 and back area and /or kidney area, respectively, since optimal fitting of portions 27 to these body zones is enabled by the thermally reversibly, deformable formed intermediate layer 9.

Since the insert parts 23 or portions 27 can be heated after formation or adaption to the human body 20 but also below forming temperature of the intermediate layer 9, this can comprise pain relieving effects and consequences reducing bad posture, respectively.

Of course with the configurations of supporting parts 1, in which these being integrated as insert parts 23 into the seat structure as described in FIG. 4 and FIG. 5, it is also possible for each single insert part 23 to be connected to a power supply 15 via lines 16, as diagrammatically indicated in short dashed lines in FIG. 5. By means of this formation each insert part 23 can separately be supplied with electric energy, thus each insert part 23 being individually adapted to the needs of a user. Simultaneously, by separately heating the intermediate layers 9 of the insert parts 23 below the forming temperature thereof, it is possible for the insert part 23 in the seat part 3 and the insert part 23 inside the back rest part 4, respectively, to be individually used as seat heating installation

What is claimed is:

1. A supporting part for supporting an occupant in a seat comprising:
   a multilayered member having a supporting layer for supporting said supporting part on the seat; an intermediate layer of thermally reversibly deformable material supported by said supporting layer and deformable from a predetermined first shape to a second shape conforming to the contours of the occupant in the seat; a heating layer sandwiched and affixed between said supporting layer and said intermediate layer for heating said intermediate layer to a predetermined temperature to form said second shape, said heating layer including strip conductor heating elements embedded in a resin layer which are energized by an external power supply; and a covering layer affixed to said intermediate layer for enclosing said intermediate layer and said heating layer between said covering layer and said supporting layer.

2. The supporting part as set forth in claim 1 wherein said heating layer further includes a plurality of carbon fibers embedded in said resin layer and electrically connected to said strip conductor heating elements.

3. The supporting part as set forth in claim 2 wherein said resin layer is an epoxy resin layer.

4. The supporting part as set forth in claim 2 wherein said intermediate layer is formed of a plastic material having closed pores having gas therein.

5. The supporting part as set forth in claim 2 wherein said intermediate layer is formed of ethylene vinyl foam having closed air voids.

6. The supporting part as set forth in claim 2 wherein said temperature for deforming said intermediate layer is between 50 degrees Celsius and 90 degrees Celsius.

7. The supporting part as set forth in claim 2 wherein the density of said intermediate layer is between 30 kg/m$^3$ and 280 kg/m$^3$.

8. A seat for supporting an occupant in a vehicle comprising:
   a seat cushion having a resilient foam pad at least partially encased in a cover material;

a seat back having a resilient foam pad at least partially encased in a cover material;

a supporting part affixed between said foam pad and said cover material of at least one of said seat cushion and said seat back, said supporting part comprising a multilayered member having an intermediate layer of thermally reversibly deformable material supported by, said foam pad and positioned adjacent said cover material, said intermediate layer being deformable from a predetermined first shape to a second shape conforming to the contours of the occupant in the seat, and a heating layer sandwiched and affixed between said foam pad and said intermediate layer for heating said intermediate layer to a predetermined temperature to form said second shape, said heating layer including strip conductor heating elements embedded in an resin layer which are energized by an external power supply and a plurality of carbon fibers embedded in said resin layer and electrically connected to said strip conductor heating elements.

9. The seat as set forth in claim 8 wherein said resin layer is an epoxy resin layer.

10. The seat as set forth in claim 8 wherein said intermediate layer is formed of a plastic material having closed pores having gas therein.

11. The seat as set forth in claim 8 wherein said intermediate layer is formed of ethylene vinyl foam having closed air voids.

12. The seat as set forth in claim 8 wherein said temperature for deforming said intermediate layer is between 50 degrees Celsius and 90 degrees Celsius.

13. The seat as set forth in claim 8 wherein the density of said intermediate layer is between 30 kg/m$^3$ and 280 kg/m$^3$.

* * * * *